May 16, 1933.   E. R. EVANS   1,908,835
PROTECTIVE APPARATUS FOR ELECTRICAL SYSTEMS
Filed Aug. 9, 1930
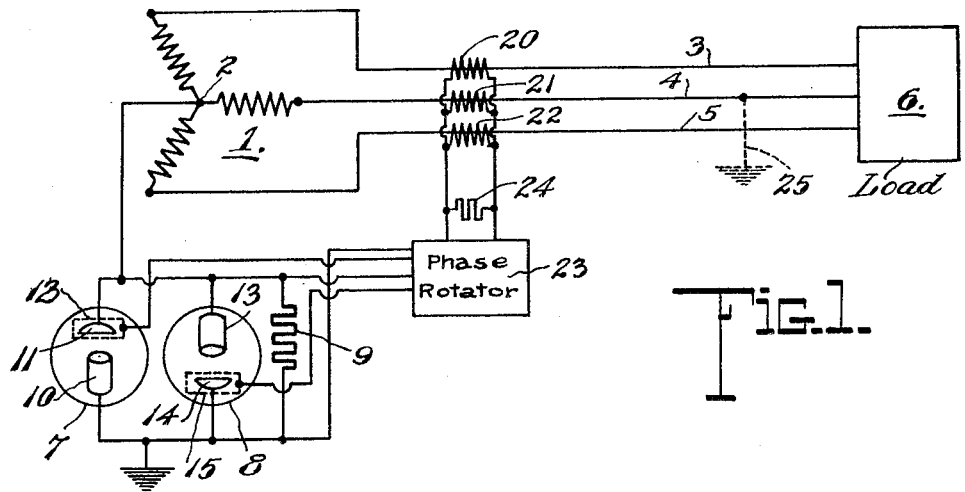
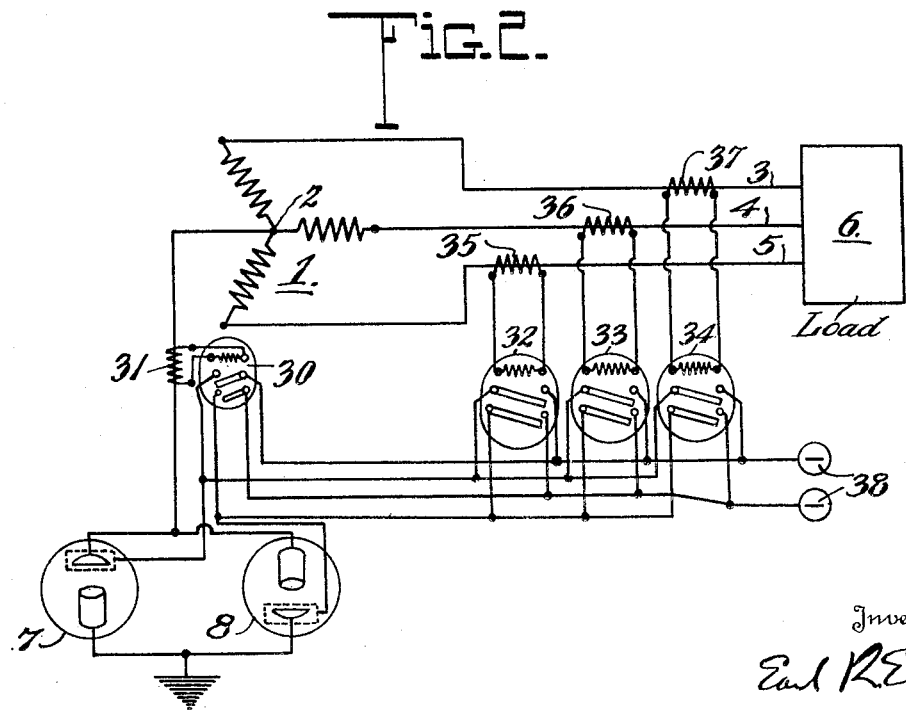
Inventor
Earl R. Evans Patented May 16, 1933

1,908,835

UNITED STATES PATENT OFFICE

EARL R. EVANS, OF WASHINGTON, DISTRICT OF COLUMBIA

PROTECTIVE APPARATUS FOR ELECTRICAL SYSTEMS

Application filed August 9, 1930. Serial No. 474,250.

My invention relates to a protective means for polyphase power systems and particularly to means adapted to be connected in the neutral of a polyphase system, which is responsive to accidental arcing grounds, and other similar disturbances.

One object of my invention is to provide a device of variable impedance connected in the neutral of a polyphase system and responsive to or controlled in accordance with predetermined conditions, such for example as the occurrence of a zero phase-sequence component of current flowing in the system; i. e., to control the current flowing in the neutral connection under unbalanced conditions caused by grounds or faults in the system. Accordingly I proposed to connect between the neutral and ground, a space-discharge device of controllable impedance, preferably a tube operating with an arc-discharge as contra-distinguished from space-discharge devices operating with substantially pure electronic discharge. The arc-discharge tube preferably employed, one embodiment of which is described in the patent to Langmuir, No. 1,289,823, dated December 31, 1918, has a large current-carrying capacity and a low internal voltage drop so that it is adapted to operate with high efficiency on ordinary power circuits.

When an alternating current of relatively low frequency is applied to the cathode and anode of the Langmuir tube, the average value of the space current through the device depends upon the magnitude, and in some instances, the phase relation of the potential on the control electrode. Where a steady grid-biasing voltage is employed, the average value of the space current depends upon the magnitude of this voltage. The detailed construction and theory of operation is set forth in the above-mentioned patent. Accordingly, this specific tube is referred to herein, although the detailed construction of the arc-discharge device may be modified, as the object of the invention, in general terms, is to provide a system embodying a device of this character which is responsive to or is rendered operative by, the occurrence of a fault or other predetermined condition in a polyphase system and is operative to control the impedance of the neutral.

Another object of my invention is to provide means for quickly interrupting the arc and automatically restoring the balance of a system when it is disturbed by an arcing ground.

Another object of my invention is to provide an arrangement wherein little or no modification of the circuit proper is necessary for the installation of protective means embodying my invention.

A further object is to provide protective means which will not disturb the standard lightning protection devices, but will actually augment their functions.

Other objects will appear from the following detailed description of the embodiments of the invention, shown in the accompanying drawing, wherein Fig. 1 is a diagrammatic view of a polyphase system, showing one form of protective means embodying my invention, and Fig. 2 is a similar view of a modification.

Referring to the drawing, the system shown in Fig. 1 comprises a polyphase power source, 1, having a grounded neutral point 2. Connected to this neutral point are three phase conductors 3, 4 and 5 supplying current to any suitable load designated 6. As here shown, the ground connection to neutral point 2, includes a plurality of space-discharge devices 7 and 8, reversely connected and having in parallel with them a fixed impedance device 9.

For purposes of illustration, the device 7 is shown as a tube of the type disclosed in said Langmuir patent having a hot cathode 10, an anode 11, and a grid or control electrode 12. Similarly the device 8 has a hot cathode 13, an anode 14 and a grid or control electrode 15. The construction and arrangement of the electrodes of the tubes and the pressure and nature of the gas-filling in these tubes is such that the average current through the tubes depends upon the potential of the control electrodes, as described in the above-mentioned Langmuir patent. The anode-cathode circuits of tubes 7 and 8 are reversely connected in parallel relation in the neutral connection, so that when these circuits are conductive, and current is flowing in the neutral, it may pass to ground during both halves of the cycle.

Associated with the three phases 3, 4 and 5 of the polyphase circuit are current transformers 20, 21 and 22, respectively, adapted in well known manner, when connected as shown, to deliver current proportional to the zero phase-sequence component of the polyphase circuit to the output terminals which are shunted by a resistor 24, as is usual in systems of this character. The connections are such as to supply this zero phase-sequence current to the control electrodes 12 and 15, a phase rotator 23 being arranged, if desired, to insure the proper phase relation of control electrode potential to the line current for satisfactory operation.

Under normal conditions, the sum of the currents of the three phases of the circuit will be zero, hence the zero phase-sequence component of current in the system will be zero and no current will flow between neutral point 2 and ground. The impedance of device 9 is sufficiently large to prevent substantial current flow in the neutral when the potential of neutral point 2 is of predetermined value, but allows a small current to flow in parallel to the tubes 7 and 8 to take care of small disturbing transient currents not of a character to render the tubes operative.

When a ground occurs on one of the phases of system, for example, an arcing ground 25 on phase conductor 4, a discharge will occur tending to lower the potential of this conductor and unbalance the system. As soon, however, as the arc starts, a difference of potential will be established between neutral point 2 and ground. The presence of a zero phase-sequence component will cause control electrodes 12 and 15 to become more negative with respect to the corresponding cathodes, thereby increasing the impedance of tubes 7 and 8. The increase of impedance of the neutral connection will decrease the fault current and extinguish the arc. As soon as the arc at the fault is broken and the voltage between wire 4 and ground rises to its normal value, the potentials will be removed from the terminals of the tubes 7 and 8, thereby discontinuing the arc discharges in the tubes.

The characteristics of space-discharge devices of the type referred to are such that they will carry large currents and control them by the expenditure of small amounts of power. With the connections as shown, disturbances, particularly in the form of intermittent arcing grounds, are prevented from seriously disrupting the operation of a power circuit, although the neutrals of the system are grounded as has been found necessary in actual practise. The impedance of the neutral connection is varied within a fraction of a cycle to compensate the effect of faults occurring in the system, either locally or at remote points, the protective devices preferably being installed in the main generating station and at each point where the neutral is grounded. If a variable impedance of the character described is not installed in each neutral connection in the system, resistance or impedance should be used of sufficient magnitude to limit the current upon the occurrence of a ground fault near such neutral connection to a comparatively small value.

Protective means embodying my invention are suited not only for overcoming the serious results caused by arcing grounds, but also to overcoming other abnormal conditions of various kinds which occur in transmission systems and cause currents to flow in the neutral. In Fig. 2 I have shown one way in which means embodying my invention can be utilized in the neutral connection of a circuit to aid in neutralizing the effects of conditions such as a short-circuit between phases, such faults being almost invariably accompanied by a ground current.

Referring now to Fig. 2, a polyphase circuit is shown as in Fig. 1 with the neutral point 2 grounded through two arc discharge devices 7 and 8, for example of the type disclosed in the above-mentioned Langmuir patent. Likewise current is supplied to the load 6 over line wires 3, 4 and 5. Inductively associated with the connection from neutral point 2 to the tubes 7 and 8 is a current transformer 31 supplying current to the operating coil of an over-current relay 30 which is thus responsive to the zero phase-sequence component of current in the system. Similarly associated with line wires 3, 4 and 5 are current-transformers 37, 36 and 35, respectively, supplying current to the operating coils of over-current relays 32, 33 and 34.

The over-current relay 30 controls the potential supplied to the control electrode of tube 7, from a suitable source 38. Likewise the relays 32, 33 and 34 are arranged to connect the source 38 with the control electrode of tube 7 when they are operated. In practice the circuit to the control electrode of tube 8 would be controlled by additional contacts on relays 30, 32, 33 and 34, connected with a separate source of current.

The operation of the system shown in Fig. 2 is as follows: Under normal conditions when no current is flowing in the neutral and the phases are balanced, relays 30, 32, 33 and 34 remain de-energized. When a disturbance occurs in the system, so as to cause current to flow in the neutral connection, relay 30 is energized thereby supplying potential to the control electrodes of tubes 7 and 8 from the source 38 through the contacts of said relay, making them more negative with respect to the cathodes and increasing the impedances of the tubes. Thus the fault current flowing in the neutral will be reduced or interrupted.

In like manner any disturbance such as a short-circuit causing a heavy current to flow in any phase of the distribution circuit will cause energization of one or more of the relays 32, 33, 34 to connect the sources of potential to the control electrode of tubes 7 and 8 and momentarily increase the impedance of the neutral. The value of this arrangement resides in the fact that short-circuits on line conductors are almost invariably accompanied by or followed by a leakage or arc to ground. The described arrangement will limit or prevent the flow of this ground current.

It will be clear that the invention is not limited to correcting for disturbances caused by arcing grounds or for short circuits occurring between phases, these being given purely as illustrations. My invention comprehends broadly the use of space discharge devices of controllable impedance connected to the neutral point of a polyphase system and operating to correct unsatisfactory conditions of any character which cause currents to flow in the neutral connection.

Although I have herein shown and described only two forms of protective systems embodying my invention, it will be obvious that various changes may be made in the details within the scope of the appended claims, without departing from the spirit and scope of my invention.

I claim:

1. A polyphase power transmission circuit having its neutral point connected to ground; a space-discharge device having its anode-cathode circuit included in said neutral connection; and means responsive to the zero phase-sequence component of current in the system for varying the impedance of said device.

2. A polyphase circuit having a grounded neutral; a space-discharge device of variable impedance connected in said neutral; and means responsive to the zero phase-sequence component of current in said circuit for increasing the impedance of said space-discharge device.

3. A polyphase power circuit having a grounded neutral; a space-discharge device included in said ground connection; and means responsive to abnormal circuit conditions resulting from the occurrence of a fault in the system for reducing the ground current by increasing the impedance of said space-discharge device.

4. A polyphase power circuit having a grounded neutral; a space-discharge device having an anode, a cathode and a control electrode, the anode-cathode circuit being included in said neutral connection; and means responsive to the occurrence of a fault on the circuit for varying the potential of said control electrode in a direction to increase the impedance of the space-discharge device.

5. A polyphase power circuit having its neutral point connected to ground, an arc-discharge device in said neutral connection and means for increasing the impedance of said device upon the occurrence of excessive current in one or more of the phases of said circuit.

6. A polyphase power circuit having its neutral point connected to ground, a space-discharge device of variable impedance in said neutral connection, means for controlling the impedance of said device in accordance with an electrical characteristic of said circuit and a shunt path of high impedance around said device.

7. A polyphase circuit having a grounded neutral and a space-discharge device having a predetermined initial impedance connected in series relation in said neutral to be traversed by ground current when said circuit becomes grounded, said device embodying means whereby its impedance is increased upon the occurrence of such ground current.

8. A polyphase power transmission circuit having a connection from neutral to ground, an arc-discharge tube in series relation in said ground connection and means for controlling the impedance of said tube by and in accordance with the magnitude of the zero phase-sequence current flowing in said connection as a result of a ground fault on said circuit.

In testimony whereof I affix my signature.

EARL R. EVANS.